United States Patent
Berstis et al.

(10) Patent No.: US 8,117,056 B2
(45) Date of Patent: Feb. 14, 2012

(54) INTEGRATING SPECIAL REQUESTS WITH A CALENDAR APPLICATION

(75) Inventors: Viktors Berstis, Austin, TX (US); Samuel Roy Detweiler, Cedar Park, TX (US); Randolph Michael Forlenza, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1053 days.

(21) Appl. No.: 11/425,110

(22) Filed: Jun. 19, 2006

(65) Prior Publication Data
US 2007/0294120 A1    Dec. 20, 2007

(51) Int. Cl.
*G06Q 10/00*    (2006.01)

(52) U.S. Cl. .................. 705/7.19; 705/7.18; 705/7.21; 705/7.22; 705/7.23

(58) Field of Classification Search ............... 705/7–10
See application file for complete search history.

(56) References Cited

U.S. PATENT DOCUMENTS

| | | | |
|---|---|---|---|
| 5,615,131 A | 3/1997 | Mortensen et al. | |
| 5,896,129 A | 4/1999 | Murphy et al. | |
| 7,236,976 B2 * | 6/2007 | Breitenbach et al. | 707/100 |
| 2001/0025241 A1 | 9/2001 | Lange et al. | |
| 2003/0004773 A1 * | 1/2003 | Clark et al. | 705/8 |
| 2003/0005461 A1 | 1/2003 | Shinohara | |
| 2004/0076269 A1 | 4/2004 | Engelke et al. | |
| 2005/0210516 A1 | 9/2005 | Pettinato | |
| 2007/0265902 A1 * | 11/2007 | Brennen et al. | 705/8 |

* cited by examiner

*Primary Examiner* — David Rines
(74) *Attorney, Agent, or Firm* — Yee & Associates, P.C.; Mark C. Vallone

(57) ABSTRACT

The illustrative embodiments provide a computer implemented method, computer usable program code, and system for managing special requests of meeting attendees through an electronic calendar application. A host lists prospective attendees to a meeting in an electronic calendar application. The calendar application searches the attendees' profiles for any special requests the attendees may have. Upon finding a special request, the calendar application contacts an appropriate special requests service vendor and arranges for the special requests service. The calendar application then follows up by confirming the meeting with the special requests service vendor and inviting the meeting attendees.

18 Claims, 3 Drawing Sheets

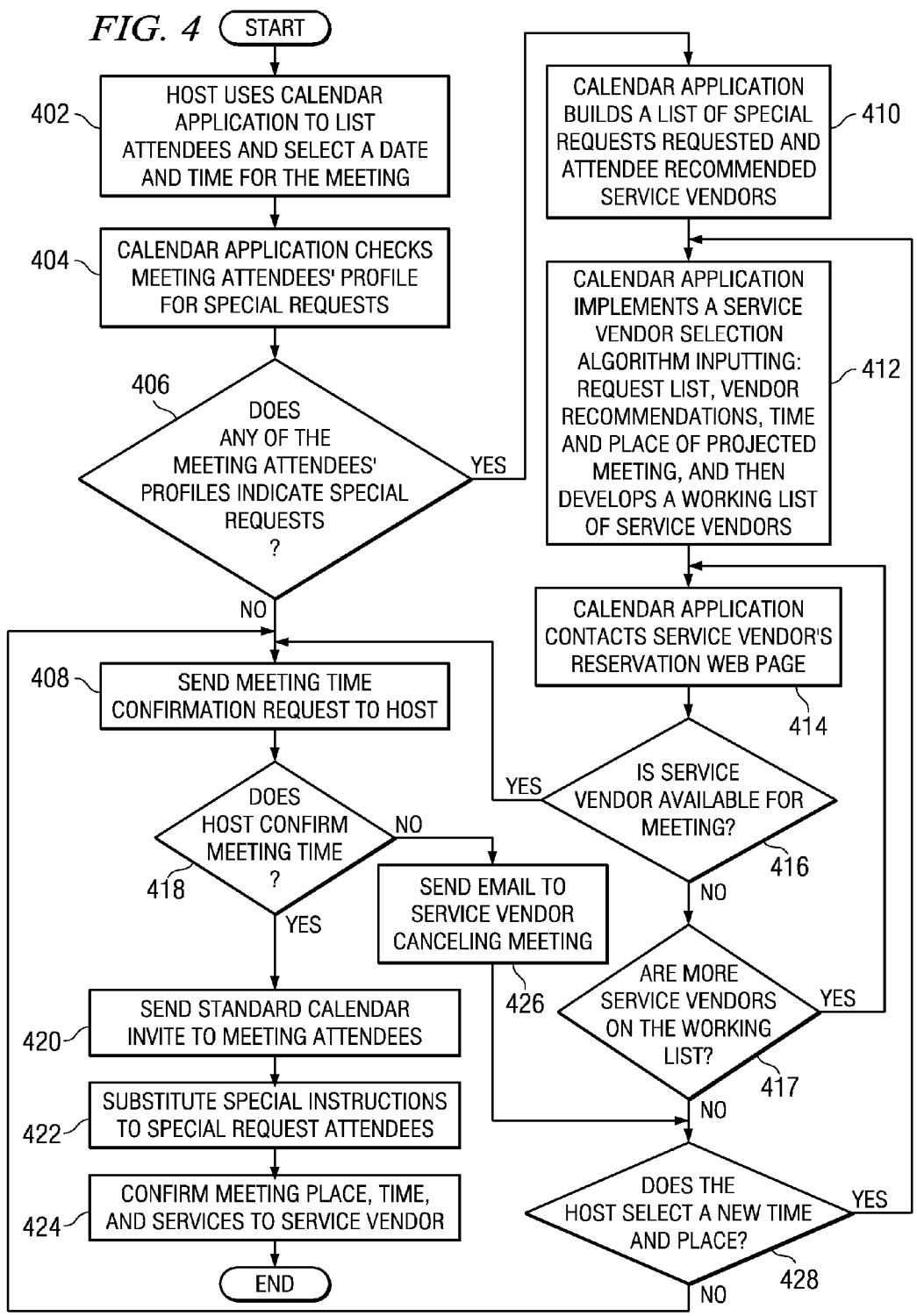

INTEGRATING SPECIAL REQUESTS WITH A CALENDAR APPLICATION

BACKGROUND OF THE INVENTION

1. Field of the Invention

The present invention relates generally to electronic calendar applications. More specifically, the present invention relates to a computer implemented method, computer usable program code, and system for detecting and scheduling services for special requests meeting attendees.

2. Description of the Related Art

The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. The set of protocols used on the Internet is called Transmission Control Protocol/Internet Protocol (TCP/IP).

With respect to transferring data over the Internet, the World Wide Web environment is used. This environment is also referred to simply as "the Web." The Web is a mechanism used to access information over the Internet. In the Web environment, servers and clients effect data transactions using the hypertext transfer protocol (HTTP), a known protocol for handling the transfer of various data files, such as text files, graphic images, animation files, audio files, and video files.

The Internet has revolutionized communications and commerce, as well as being a source of both information and entertainment. For many users, email is a widely used format to communicate over the Internet. Additionally, the Internet is also used for real-time voice conversations and for instant messaging. Email may be used to input appointments and to set up meetings in calendar applications used by many businesses.

An electronic calendar application (calendar application) is a program that enables the user to record events and appointments on a computer. Calendar applications typically have features such as automatic entries for regular events and reminders that signal the user of an upcoming event. Businesses commonly use calendar applications as schedulers, which enables groups of users connected to a network to coordinate their schedules.

Currently, however, calendar applications do not aid in identifying or scheduling special requests that the meeting attendees may have. Meeting attendees are any participants of a meeting, whether the meeting is a teleconference, a video conference, an informal meeting between coworkers or a multinational symposium. Meeting attendees may have special requests for the meeting. A special request is any request by a meeting attendee that is not common to the meeting attendees as a whole. These special requests may range from medical requirements, such as a wheelchair service, to personal preferences, such as a brand of water preferred by a top executive. Further examples of some of these special requests include: airport limousine service, captioning services, if the attendee is deaf or hard of hearing or if a record of the meeting is desired, translation services if attendees do not speak a common language, and wheelchair or medical assistance. Currently, meeting attendees must arrange for these services which may result in higher costs, redundant services, and scheduling problems.

SUMMARY OF THE INVENTION

The illustrative embodiments provide a computer implemented method, computer usable program code, and system for managing special requests of meeting attendees through an electronic calendar application. A host lists prospective attendees to a meeting in an electronic calendar application. The calendar application searches the attendees' profiles for any special requests the attendees may have. Upon finding a special request, the calendar application contacts an appropriate special requests service vendor and arranges for the special requests service. The calendar application then follows up by confirming the meeting with the special requests service vendor and inviting the meeting attendees.

BRIEF DESCRIPTION OF THE DRAWINGS

The novel features believed characteristic of the illustrative embodiments are set forth in the appended claims. A preferred mode of use, further objectives and advantages thereof, will best be understood by reference to the following detailed description of an illustrative embodiment when read in conjunction with the accompanying drawings, wherein:

FIG. 4 is a flowchart which illustrates a method of managing special requests with a calendar application, in accordance with the illustrative embodiments.

DETAILED DESCRIPTION OF THE PREFERRED EMBODIMENT

Figure 1:
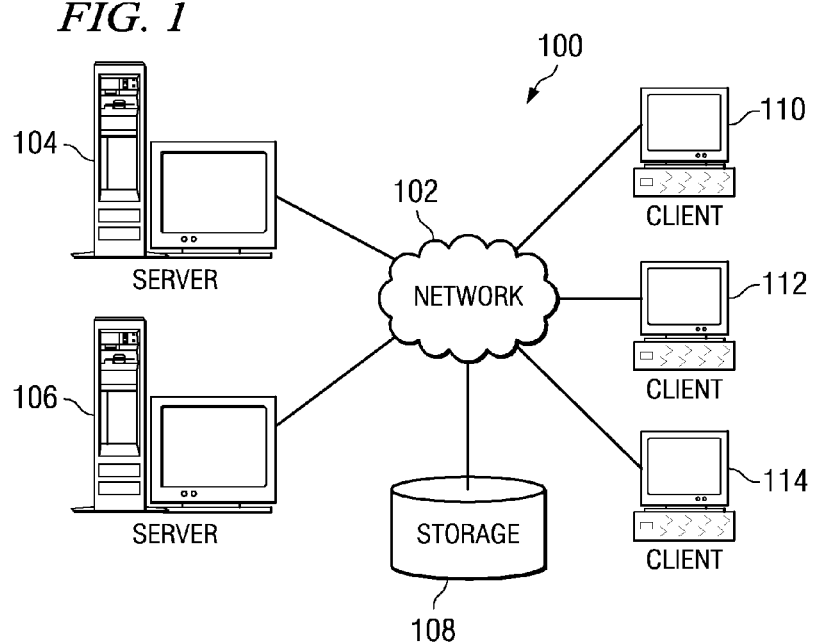
FIG. 1 depicts a pictorial representation of a network of data processing systems in which illustrative embodiments may be implemented.
Figure 2:
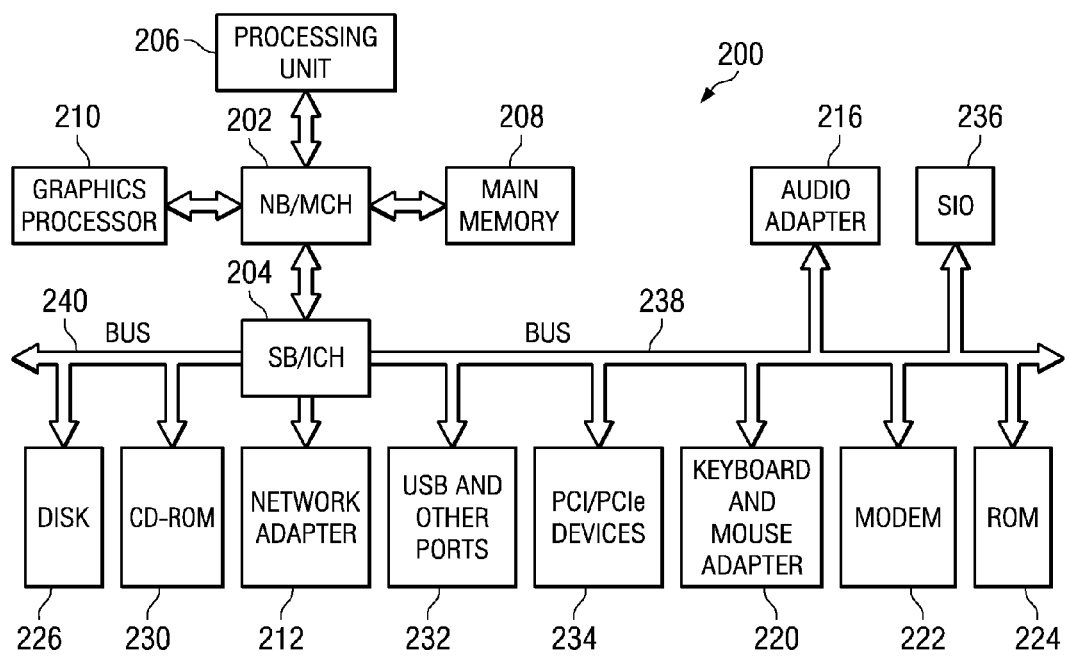
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The methods of the illustrative embodiments may be performed in a data processing system, such as data processing system 100 shown in FIG. 1 or data processing system 200 shown in FIG. 2.

The illustrative embodiments provide a computer implemented method, computer usable program code, and system for managing special requests of meeting attendees through an electronic calendar application. A host lists intended attendees to a meeting in an electronic calendar application. The calendar application searches the attendees' profiles for any special requests the attendees may have. Upon finding a special request, the calendar application contacts an appropriate special requests service vendor and arranges for the special requests service. A special requests service vendor is the provider that accommodates the special request. Examples of special requests service vendors are a translation service, or a catering service. The calendar application then follows up by confirming the meeting with the special requests service vendor and inviting the meeting attendees.

Figure 3:
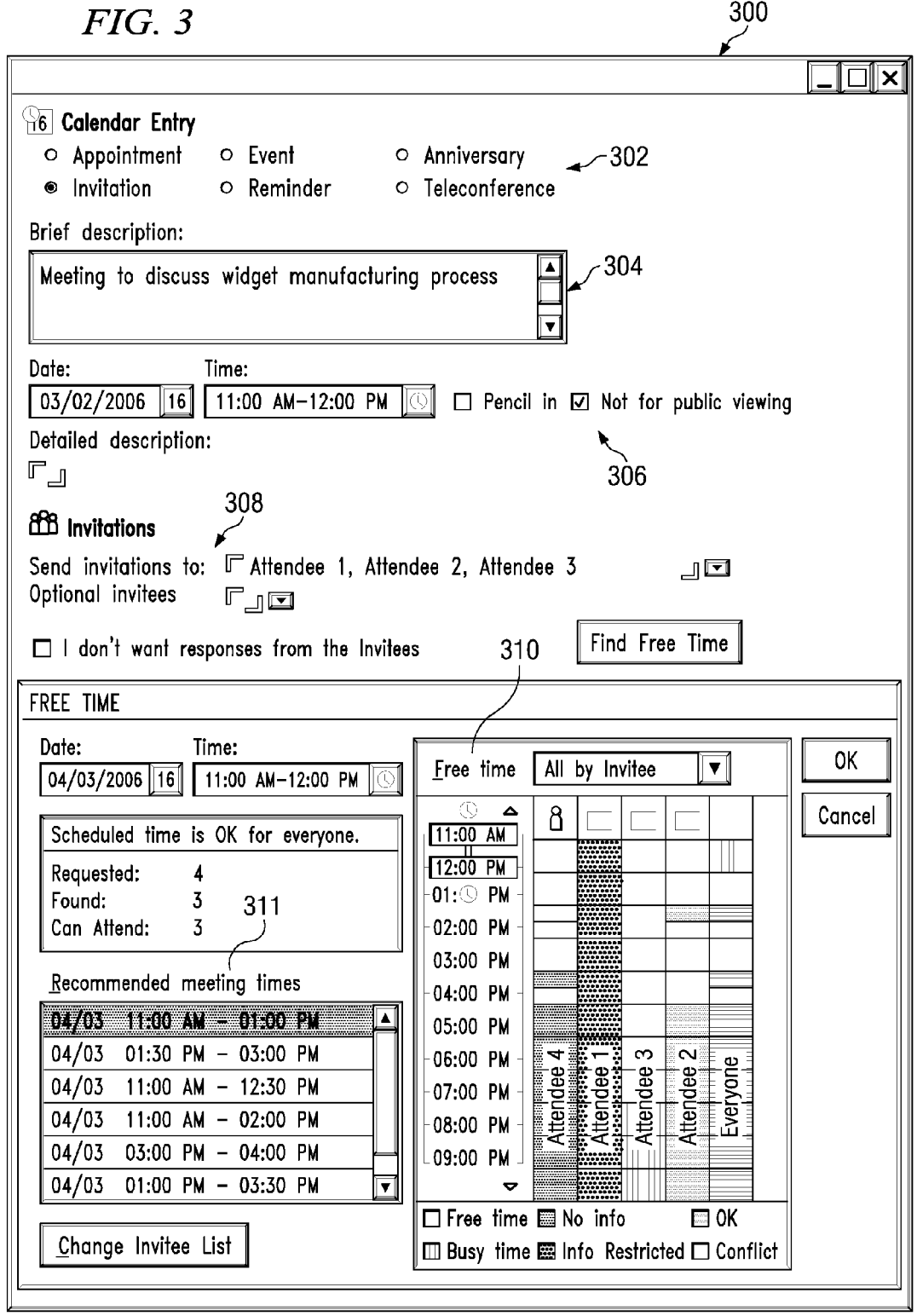
FIG. 3 is a screen shot depicting a calendar application entry page in accordance with the illustrative embodiments.

FIG. 3 is a screen shot depicting one of many possible calendar application entry pages in accordance with the illustrative embodiments. The calendar entry page is an exemplary page taken from a Lotus Notes® calendar application. Lotus Notes® is a registered trademark of the International Business Machines Corporation with headquarters located in Armonk, N.Y. However, FIG. 3 is only exemplary and is not intended to assert or imply any limitation with regard to the environments in which different embodiments may be implemented. There are other calendar applications, rather than the depicted application, on which aspects of the illustrative embodiments may be implemented.

Calendar entry page 300 is pictured with invitation option 302 selected. Brief description text box 304 indicates the subject matter of the meeting. Box 306 entitled "Not for public viewing" is selected informing the calendar application that the brief description, as well as other information, may be private information. Responsive to whether box 306 is selected, the calendar application may provide the minimum information necessary to special requests service vendors. Invitation list of attendees 308 lists all of the invitees to the meeting. List 308 indicates that at least Attendee 1, Attendee 2, and Attendee 3 are attendees of the meeting. Responsive to the "Find Free Time" option of the calendar application, box 310 represents the schedules of the meeting attendees and includes recommended meeting times 311. In this example calendar application, the attendees' busy times are represented by a different color than the attendees' free time. The host is included as the fourth meeting attendee in box 310. In another illustrative embodiment, the service vendor is linked into the calendar system of the host and therefore the service vendor schedule is also represented on the calendar entry page in box 310. In accordance with the illustrative embodiments, another user of the calendar system, other than a host or meeting attendee, may schedule and invite attendees to meetings.

FIG. 4 is a flowchart which illustrates a method for managing special requests with a calendar application in accordance with the illustrative embodiments. The meeting host uses a calendar scheduler, such as the one pictured in FIG. 3, to list attendees and choose a date and time for the meeting (step 402). The calendar application accesses the profiles of the meeting attendees (step 404).

Profiles are electronic files containing personal information such as telephone numbers, addresses, and languages spoken. In accordance with an illustrative embodiment, special requests and lists of special requests vendors are also included in the profiles. Each special request may be listed in a separate field in the profile. Examples of special requests may be, "Provide captioning," or "provide a vegetarian meal." Profiles are often editable by the individual being profiled and may include information such as a preferred vendor for various services. Profiles are often used as electronic phone books in large businesses and are frequently available to the public. Therefore, the special requests and preferred vendor information may be stored in a hidden field or fields that can only be accessed by the electronic calendar application. The profiles can be stored anywhere from a global network system to the computer of the host.

The calendar application may also check profiles to ensure that the attendees have a language in common. If not, the calendar application may initiate a language translation service as a special request. Other special requests may be limousine services, real time captioning services, sign language services, wheelchair availability, or medical assistance. The meeting may be any real time group communication. Examples range from large hall symposiums and multinational online meetings, to a two person teleconference.

The calendar application searches within the profiles of the attendees for a request for special services (step 406). If no special services are requested, the calendar application sends a request to the meeting host requesting a meeting time confirmation (step 408). The confirmation request may be as simple as a pop up screen or the confirmation request may be an email message.

If special services are requested by at least one attendee, the calendar application builds a list of services requested and attendee-recommended service vendors (step 410). Next the calendar application implements a service vendor selection algorithm (step 412). The service vendor selection algorithm uses the service requests requirements list, attendee service vendor recommendations, time and place of the projected meeting, location of the service vendor and other user configurable variables to make a service vendor decision. The service vendor selection algorithm may use a list of pre-qualified vendors. Pre-qualified vendors are service providers that have been previously evaluated and approved. The service vendor selection algorithm may be a complex set of rules or as simple as using the first attendee recommended service vendor on a list. The service vendor selection algorithm may be user (host) configurable or may be enterprise configurable for an entire business unit. The algorithm develops a working list of appropriate service vendors.

Next, the calendar application contacts the first service vendor selected by the algorithm (step 414). Contacting the service vendor is preferably accomplished through an electronic input of the information into the service vendor's reservation Web page. The vendor's reservation Web page preferably works similarly to a hotel or automobile rental reservation Web page. However, an email or a phone call to the service vendor to schedule services for the meeting is also within the scope of the illustrative embodiments.

The service vendor will receive a sanitized description of the meeting. A sanitized description will include only the date, time, and services required of the vendor. The service vendor then indicates availability for the time, place, and service indicated by the host calendar application (step 416).

If yes, service vendor is available to provide special services for the meeting, the calendar application sends a meeting time confirmation request to the meeting host (step 408). If the service vendor is not available to provide special services for the meeting, a determination is made as to whether there are more service vendors on the working list (step 417). If there are more service vendors on the working list, the calendar application contacts the next service vendor on the service vendor selection algorithm working list (414). If the next service vendor is likewise unable to accommodate the meeting, the calendar application checks to see if there is another service vendor listed on the algorithm's working list (step 417). If there is another service vendor listed, the calendar application selects another service vendor (step 414). The process continues until a service vendor is scheduled or the calendar application notifies the host that a special service request has not been accommodated. If there are no more service vendors on the working list, the calendar application offers a choice to the user (step 428). The user can choose a new date and time and begin the process again (step 412), or the host may decide to hold the meeting without accommodating the special request (step 408).

Returning now to step 408, wherein a meeting time confirmation request is sent to the host, and continuing to the next step, the calendar application determines whether the host confirms the meeting time and place (step 418). If the meeting time and place is confirmed by the host, then the calendar application sends meeting invitations to the attendees (step 420). Meeting invitations are typically email messages that are sent to each meeting attendee. However, it is within the scope of the illustrative embodiments to invite attendees by automatically updating the attendee's calendar or other form of notification. If, within the invitation, there are special instructions, for instance, a different telephone number to call for a teleconference meeting, the special instructions are enumerated on the invitation for the attendee requesting the service only (step 422). As part of the invitation process, the calendar application will also send a confirmation to the service vendor confirming the meeting time and place and services required (step 424) with the process terminating thereafter.

Returning now to step 418, if the host does not confirm the date and time of the meeting, and the service vendor has been contacted, an email is sent to the service vendor canceling the meeting service request (step 426). The host then has the option to select a new time and place (step 428) and if a new time and place is selected, the service vendor selection algorithm is run again, using new values for the variables (step 412).

The illustrative embodiments provide a computer implemented method, computer usable program code, and system for managing special requests of meeting attendees through an electronic calendar application. A host lists intended attendees to a meeting in an electronic calendar application. The calendar application searches the attendees' profiles for any special requests the attendees may have. Upon finding a special request, the calendar application contacts an appropriate special requests service vendor and arranges for the special requests service. The calendar application then follows up by confirming the meeting with the special requests service vendor and inviting the meeting attendees.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can store the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing special requests of meeting attendees through an electronic calendar application, comprising:
    locating, by a processor of a computer, at least one meeting attendee profile, wherein the at least one meeting attendee profile includes a first list of special requests and an associated list of special requests service vendors;
    identifying, by the processor, at least one meeting attendee with a special request;
    building, by the processor, a second list of special requests based at least in part on the first list of special requests;
    developing, by the processor, a working list of vendors for the second list of special requests, wherein the working list of vendors includes at least one of the special requests service vendors associated with the first list of special requests, and wherein the developing comprises utilizing, by the processor, a plurality of specified inputs, the specified inputs including an identification, from the at least one meeting attendee, of a vendor recommendation;
    responsive to the identifying of the at least one meeting attendee with the special request, automatically linking, by the processor, a schedule of a special requests service vendor into the electronic calendar application so that the schedule is automatically displayed in a graphical user interface of the electronic calendar application for use by a host in scheduling the special requests service vendor, and responsive to a display of the schedule, scheduling, by the processor, the special requests service vendor;
    confirming, by the processor, an availability of the special requests service vendor;
    substituting, by the processor, a special instruction into a standard meeting invitation to create a modified meeting invitation for the at least one meeting attendee;
    sending, by the processor, the standard meeting invitation to the meeting attendees without one or more special requests and sending, by the processor, the modified meeting invitation to the at least one meeting attendee with the special request; and
    informing the special requests service vendor, by the processor, that a meeting date, time and location has been confirmed.

2. The computer implemented method of claim 1, further comprising: sending, by the processor, the special instruction only to the at least one meeting attendee with the special request.

3. The computer implemented method of claim 1, further comprising: hiding, by the processor, special requests from public view in a profile of the meeting attendee.

4. The computer implemented method of claim 1, wherein the special requests service vendors receive only information necessary to schedule services.

5. The computer implemented method of claim 1, wherein the confirming, by the processor, of the availability of the special requests service vendor comprises automatically contacting, by the processor, a web page of the special requests service vendor to determine whether the special requests service vendor is available for the meeting.

6. The computer implemented method of claim 5, wherein the first list of special requests includes a real time captioning request, a sign language services request, a translation services request, a wheelchair availability request, and a medical assistance request.

7. The computer implemented method of claim 1, further comprising: identifying, by the processor, the special request wherein the meeting attendees have no language in common.

8. A computer program product for managing special requests of meeting attendees through an electronic calendar application, the computer program product comprising:
    a computer usable tangible storage device including:
    computer usable program code for locating at least one meeting attendee profile, wherein the at least one meeting attendee profile includes a first list of special requests and an associated list of special requests service vendors;
    computer usable program code for identifying at least one meeting attendee with a special request;

computer usable program code for building a second list of special requests based at least in part on the first list of special requests;

computer usable program code for developing a working list of vendors for the second list of special requests, wherein the working list of vendors includes at least one of the special requests service vendors associated with the first list of special requests, and wherein the developing comprises utilizing a plurality of specified inputs, the specified inputs including an identification, from the at least one meeting attendee, of a vendor recommendation;

computer usable program code for, responsive to the identifying of the at least one meeting attendee with the special request, automatically linking a schedule of a special requests service vendor into the electronic calendar application so that the schedule is automatically displayed in a graphical user interface of the electronic calendar application for use by a host in scheduling the special requests service vendor, and responsive to a display of the schedule, scheduling the special requests service vendor;

computer usable program code for confirming an availability of the special requests service vendor;

computer usable program code for substituting a special instruction into a standard meeting invitation to create a modified meeting invitation for the at least one meeting attendee;

computer usable program code for sending the standard meeting invitation to the meeting attendees without one or more special requests and sending the modified meeting invitation to the at least one meeting attendee with the special request; and computer usable program code for informing the special requests service vendor that a meeting date, time and location has been confirmed.

9. The computer program product of claim 8, wherein the computer usable program code for substituting the special instruction into the standard meeting invitation to create the modified meeting invitation for the at least one meeting attendee substitutes the special instruction into the standard meeting invitation for only the at least one meeting attendee with the special request.

10. The computer program product of claim 8, wherein the storage device further includes: computer usable program code for hiding special requests from public view in a profile of the meeting attendee.

11. The computer program product of claim 8, wherein the computer usable program code for informing the special requests service vendor that the meeting date, time and location has been confirmed informs the special requests service vendor only of information necessary to schedule services.

12. The computer program product of claim 8, wherein the computer usable program code program code for confirming the availability of the special requests vendor automatically contacts a reservation page of the special requests service vendor to determine whether the special requests service vendor is available for the meeting.

13. The computer program product of claim 8, wherein the first list of special requests includes a real time captioning request, a sign language services request, a translation services request, a wheelchair availability request, and a medical assistance request.

14. The computer program product of claim 8, wherein the storage device further includes: computer usable program code for identifying the special request wherein the meeting attendees have no language in common.

15. A data processing system comprising:

a bus system;

a communications system connected to the bus system;

a memory connected to the bus system; and a processing unit connected to the bus system, wherein the processing unit executes a set of instructions via the memory to perform actions comprising:

locating at least one meeting attendee profile, wherein the at least one meeting attendee profile includes a first list of special requests and an associated list of special requests service vendors;

identifying at least one meeting attendee with a special request;

building a second list of special requests based at least in part on the first list of special requests;

developing a working list of vendors for the second list of special requests, wherein the working list of vendors includes at least one of the special requests service vendors associated with the first list of special requests, and wherein the developing comprises utilizing a plurality of specified inputs, the specified inputs including an identification, from the at least one meeting attendee, of a vendor recommendation;

responsive to the identifying of the at least one meeting attendee with the special request, automatically linking a schedule of a special requests service vendor into an electronic calendar application so that the schedule is automatically displayed in a graphical user interface of the electronic calendar application for use by a host in scheduling the special requests service vendor, and responsive to a display of the schedule, scheduling the special requests service vendor;

confirming an availability of the special requests service vendor;

substituting a special instruction into a standard meeting invitation to create a modified meeting invitation for the at least one meeting attendee;

sending the standard meeting invitation to the meeting attendees without one or more special requests and send the modified meeting invitation to the at least one meeting attendee with the special request; and informing the special requests service vendor that a meeting date, time and location has been confirmed.

16. The data processing system of claim 15, wherein the confirming of the availability of the special requests vendor comprises automatically contacting a reservation page of the special requests service vendor to determine whether the special requests service vendor is available for the meeting.

17. The data processing system of claim 15, wherein the first list of special requests includes a real time captioning request, a sign language services request, a translation services request, a wheelchair availability request, and a medical assistance request.

18. The data processing system of claim 15, wherein the actions further comprise: identifying a special request wherein the meeting attendees have no language in common.

* * * * *